United States Patent
Jung et al.

(10) Patent No.: US 11,304,124 B2
(45) Date of Patent: Apr. 12, 2022

(54) DETERMINING NETWORK ACCESS OF WIRELESS COMMUNICATION DEVICE

(71) Applicant: LG ELECTRONICS INC., Seoul (KR)

(72) Inventors: Manyoung Jung, Seoul (KR); Yoonoh Yang, Seoul (KR); Sangwook Lee, Seoul (KR); Suhwan Lim, Seoul (KR); Jinyup Hwang, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 16/698,904

(22) Filed: Nov. 27, 2019

(65) Prior Publication Data

US 2020/0169950 A1 May 28, 2020

(30) Foreign Application Priority Data

Nov. 27, 2018 (KR) .................. 10-2018-0148576

(51) Int. Cl.
*H04W 48/16* (2009.01)
*H04B 7/0413* (2017.01)
*H04W 48/04* (2009.01)
*H04W 8/02* (2009.01)
*H04W 4/40* (2018.01)

(52) U.S. Cl.
CPC .......... *H04W 48/16* (2013.01); *H04B 7/0413* (2013.01); *H04W 8/02* (2013.01); *H04W 48/04* (2013.01); *H04W 4/40* (2018.02)

(58) Field of Classification Search
CPC ....... H04W 48/16; H04W 8/02; H04W 48/04; H04W 4/40; H04B 7/0413
USPC ........................................... 370/328
See application file for complete search history.

(56) References Cited

U.S. PATENT DOCUMENTS

| | | | | |
|---|---|---|---|---|
| 9,113,313 | B2* | 8/2015 | Cheong | H04B 7/026 |
| 2019/0028914 | A1* | 1/2019 | Wu | H04W 24/08 |
| 2019/0253925 | A1* | 8/2019 | Gholmieh | H04W 28/0215 |
| 2019/0394828 | A1* | 12/2019 | Lei | H04W 24/02 |

* cited by examiner

*Primary Examiner* — Chuck Huynh
(74) *Attorney, Agent, or Firm* — Lee Hong Degerman Kang Waimey

(57) ABSTRACT

There is provided a method for determining, by a network node, network access of a user equipment (UE). The method may include: receiving identity information of the UE from a base station to which the UE is connected; receiving capability information of the UE from the base station, the capability information of the UE including multiple-input and multiple-output (MIMO) layer information of the UE; and determining whether to allow network access of the UE on the basis of the identity information and the MIMO layer information.

10 Claims, 9 Drawing Sheets

DETERMINING NETWORK ACCESS OF WIRELESS COMMUNICATION DEVICE

CROSS-REFERENCE TO RELATED APPLICATIONS

Pursuant to 35 U.S.C. § 119(a), this application claims the benefit of earlier filing date and right of priority to Korean Patent Application No. 10-2018-0148576, filed on Nov. 27, 2018, the contents of which are all hereby incorporated by reference herein in their entirety.

BACKGROUND OF THE SPECIFICATION

Field of the Specification

The present disclosure related to next-generation mobile communication.

DISCUSSION OF THE RELATED ART

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Recently, 3GPP LTE-A (LTE-Advanced) evolved from 3GPP LTE has been commercialized.

Meanwhile, device-to-device (D2D) communication is a distributed communication technique in which adjacent wireless nodes directly deliver traffic. In the D2D communication, a wireless node such as a mobile phone autonomously discovers another wireless node which is physically adjacent, establishes a communication session, and thereafter transmits traffic.

D2D communication, such as Bluetooth or Wi-Fi Direct supports direct communication between the wireless nodes without the support of the base station. Further, it is also possible that communication D2D scheduling is managed by the base station for D2D communication. Thus, D2D communication managed by the base station to spread traffic from concentrating in the base station can reduce the traffic overload problem.

The above-mentioned D2D communication can also be applied to vehicle-to-everything (V2X). V2X collectively refers to communication technology through vehicles and all interfaces. Implementations of V2X may be, for example, vehicle-to-vehicle (V2V), vehicle-to-infrastructure (V2I), vehicle-to-person (V2P), vehicle-to-network (V2N), and the like.

On the other hand, since the vehicle has no restriction on the battery unlike the wireless terminal, there is a need for higher power transmission compared to the wireless terminal. Accordingly, a standard for transmitting high power in V2X communication is required.

Due to the success of an evolved universal terrestrial radio access network (E-UTRAN) for fourth-generation mobile communication, that is, LTE/LTE-A, there is a growing interest in next-generation, that is, fifth-generation (5G), mobile communication, and studies thereon are being conducted.

For the fifth-generation (5G) mobile communication, studies on a new radio access technology (new RAT or NR) have been conducted.

In the NR, support for four receivers (Rx) and four layers is basically defined. However, the automobile industry requires that the use of a 2Rx receiver is exceptionally allowed in vehicle-mounted wireless communication devices in consideration of vehicle design constraints, vehicle implementation constraints, and vehicular cost-efficiency. Accordingly, discussions about exceptionally allowing the use of a 2Rx vehicle terminal in communication according to the NR are being conducted.

If communication according to the NR is allowed for a 2Rx vehicle terminal, the communication according to the NR is also allowed for a 2Rx handheld terminal. However, there is no existing method for allowing a 2Rx vehicle terminal to access a network while preventing a 2Rx handheld terminal from accessing the network.

SUMMARY OF THE SPECIFICATION

Accordingly, a disclosure of the present specification has been made in an effort to solve the aforementioned problem.

In accordance with an embodiment of the present specification, provided is a method, performed by a network node, for determining network access of a user equipment (UE). The method may include: receiving identity information of the UE from a base station to which the UE is connected; receiving capability information of the UE from the base station, the capability information of the UE including multiple-input and multiple-output (MIMO) layer information of the UE; and determining whether to allow network access of the UE on the basis of the identity information and the MIMO layer information.

According to a disclosure of the present specification, the above problem of the related art is solved.

Effects obtained through specific examples of the present specification are not limited to the foregoing effect. For example, there may be various technical effects that a person having ordinary skill in the related art can understand or derive from this specification. Accordingly, the specific effects of the present specification are not limited to that explicitly described herein but may include various effects that can be understood or derived from the technical features of the present specification.

DETAILED DESCRIPTION OF THE EMBODIMENTS

Hereinafter, based on 3rd Generation Partnership Project (3GPP) long term evolution (LTE), 3GPP LTE-advanced (LTE-A), 3GPP 5G (5th generation) or 3GPP New Radio (NR), the present specification will be applied. This is just an example, and the present specification may be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), gNB (next-generation NodeB), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

Figure 1:
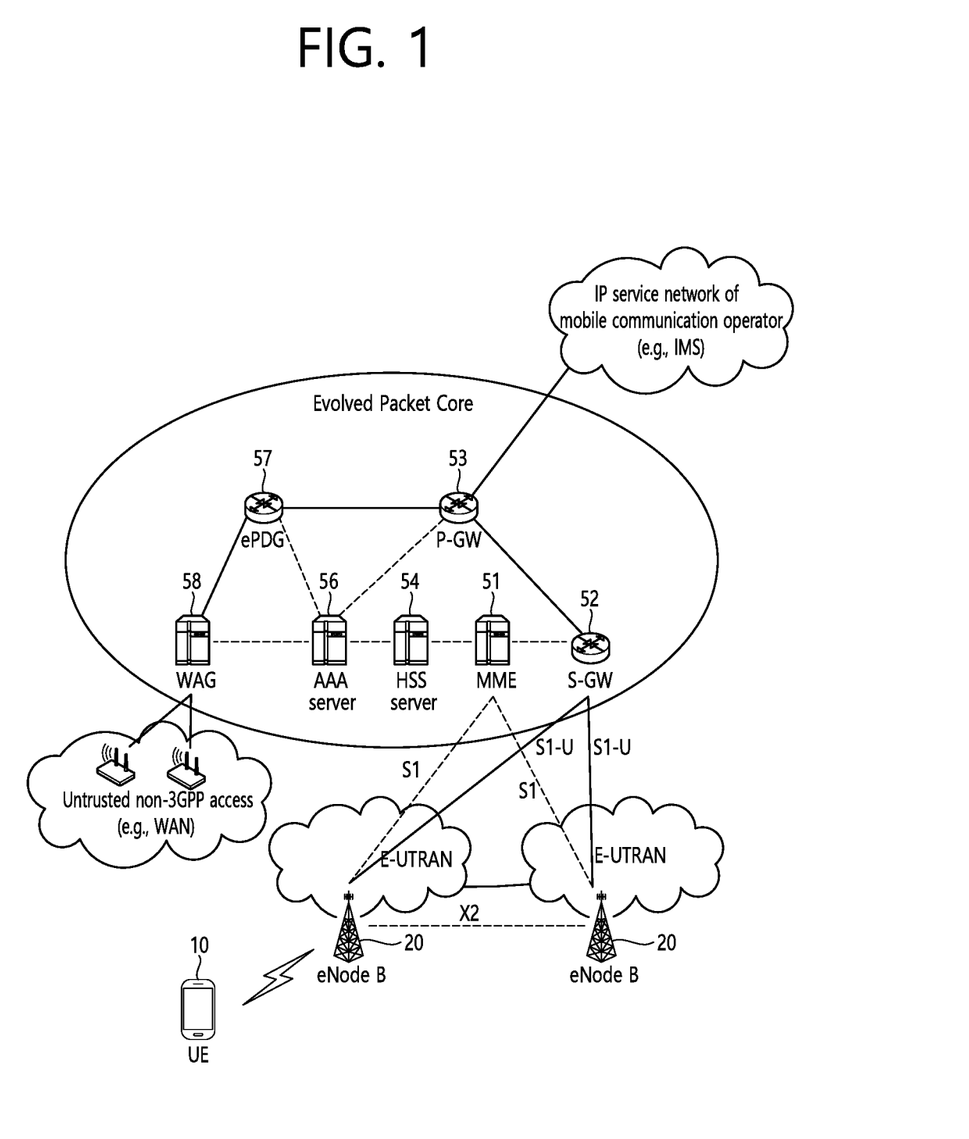
FIG. 1 shows an exemplary architecture of an evolved mobile communication network.

FIG. 1 Shows an Exemplary Architecture of an Evolved Mobile Communication Network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or user equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP Release-8), packets can be routed through the S-GW 52. Furthermore, the S-GW 52 may play a role of an anchor point for mobility with another 3GPP network (i.e., a RAN defined prior to 3GPP Release-8, e.g., a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point.

Figure 2:
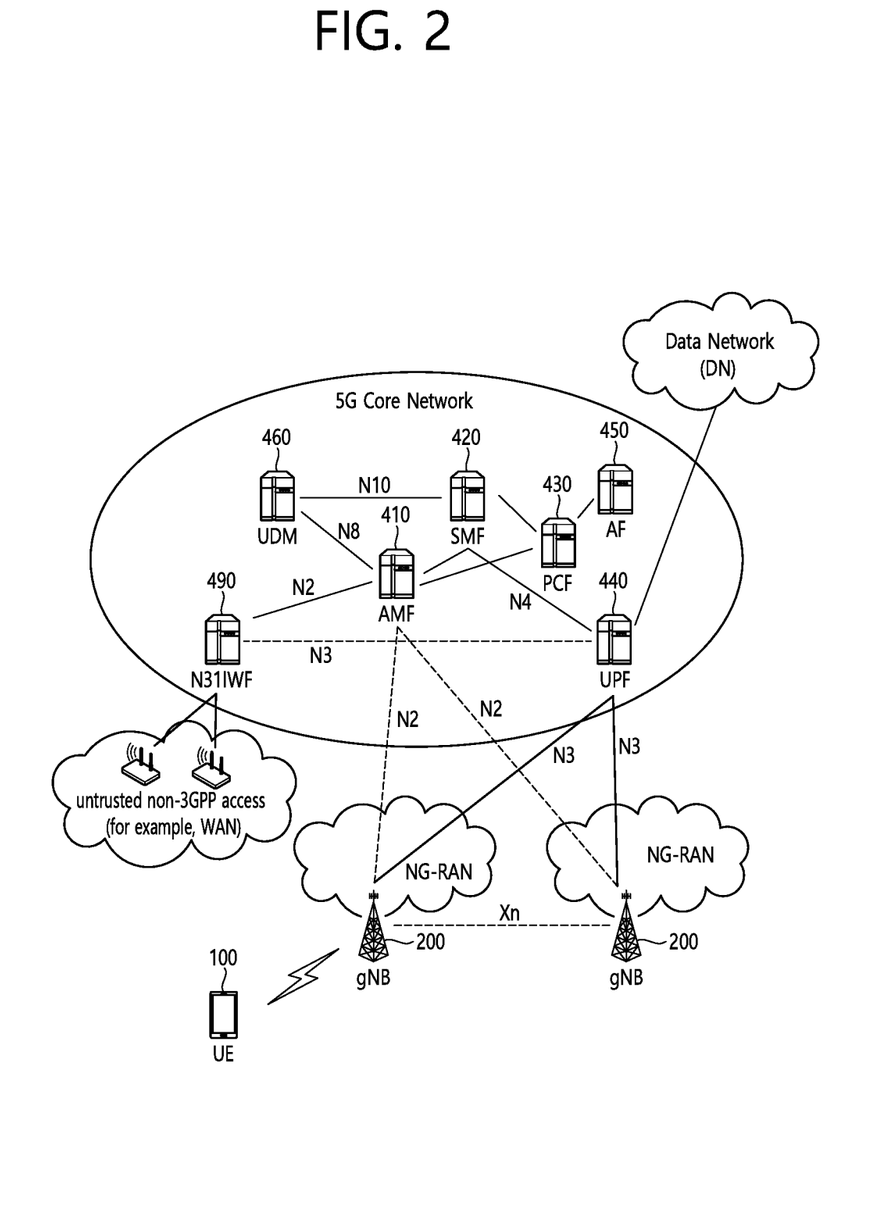
FIG. 2 illustrate the architecture of a next-generation mobile communication network.

FIG. 2 Illustrates the Architecture of a Next-Generation Mobile Communication Network.

The next-generation mobile communication network (5G system) may include various elements. FIG. 2 illustrates some elements including an Access and Mobility Management Function (AMF) 410, a Session Management Function (SMF) 420, a Policy Control Function (PCF) 430, an application function (AF) 450, a Non-3GPP Interworking Function (N3IWF) 490, a User Plane Function (UPF) 440, and a Unified Data Management (UDM) data network 460.

A UE 100 is connected to a Data Network (DN) via the UPF 440 through a Next-Generation Radio Access Network (NG-RAN) including a gNB 300.

The UE 100 may also be provided with a data service through an untrusted non-3GPP access, for example, a Wireless Local Area Network (WLAN). To connect the non-3GPP access to a core network, the N3IWF 490 may be deployed.

The N3IWF 490 performs a function of managing interworking between the non-3GPP access and the 5G system. When the UE 100 is connected to the non-3GPP access (e.g., Wi-Fi called IEEE 801.11), the UE 100 may be connected with the 5G system through the N3IWF 490. The N3IWF 490 performs control signaling with AMF 410 and is connected with the UPF 440 through an N3 interface for data transmission.

The AMF 410 may manage access and mobility in the 5G system. The AMF 410 may perform a function of managing NAS security. The AMF 410 may perform a function of handling mobility in an idle state.

The UPF is a type of a gateway through which user data is transmitted and received. The UPF node may perform all or some of user-plane functions of a Serving Gateway (S-GW) and a Packet Data Network Gateway (P-GW) in fourth-generation mobile communication.

The UPF 440 is an element that operates as a boundary point between the next-generation RAN (NG-RAN) and the core network and functions to maintain a data path between the gNB 300 and the SMF 420. When the UE 100 moves over a region served by the gNB 300, the UPF 440 serves as a mobility anchor point. The UPF 440 may perform a function of handling a PDU. The UPF 440 may route packets for mobility in the NG-RAN (defined after 3GPP Release-15). Further, the UPF 440 may function as an anchor point for mobility with another 3GPP network (i.e., a RAN defined prior to 3GPP Release-15, e.g., a UTRAN or an Evolved-Universal Mobile Telecommunications System (UMTS) Terrestrial Radio Access Network (E-UTRAN)) or a Global System for Mobile Communication (GSM)/Enhanced Data rates for Global Evolution (EDGE) Radio Access Network (GERAN). The UPF 440 may correspond to the termination point of a data interface toward a data network.

The PCF 430 is a node for controlling an operator's policy.

The AF 450 is a server for providing various services for the UE 100.

The UDM 460 is a type of a server that manages subscriber information, like a home subscriber server (HSS) in fourth-generation mobile communication. The UDM 460 stores and manages the subscriber information in a Unified Data Repository (UDR).

The SMF 420 may perform a function of allocating the Internet Protocol (IP) address of the UE 100. The SMF may control a protocol data unit (PDU) session.

Figure 3A:
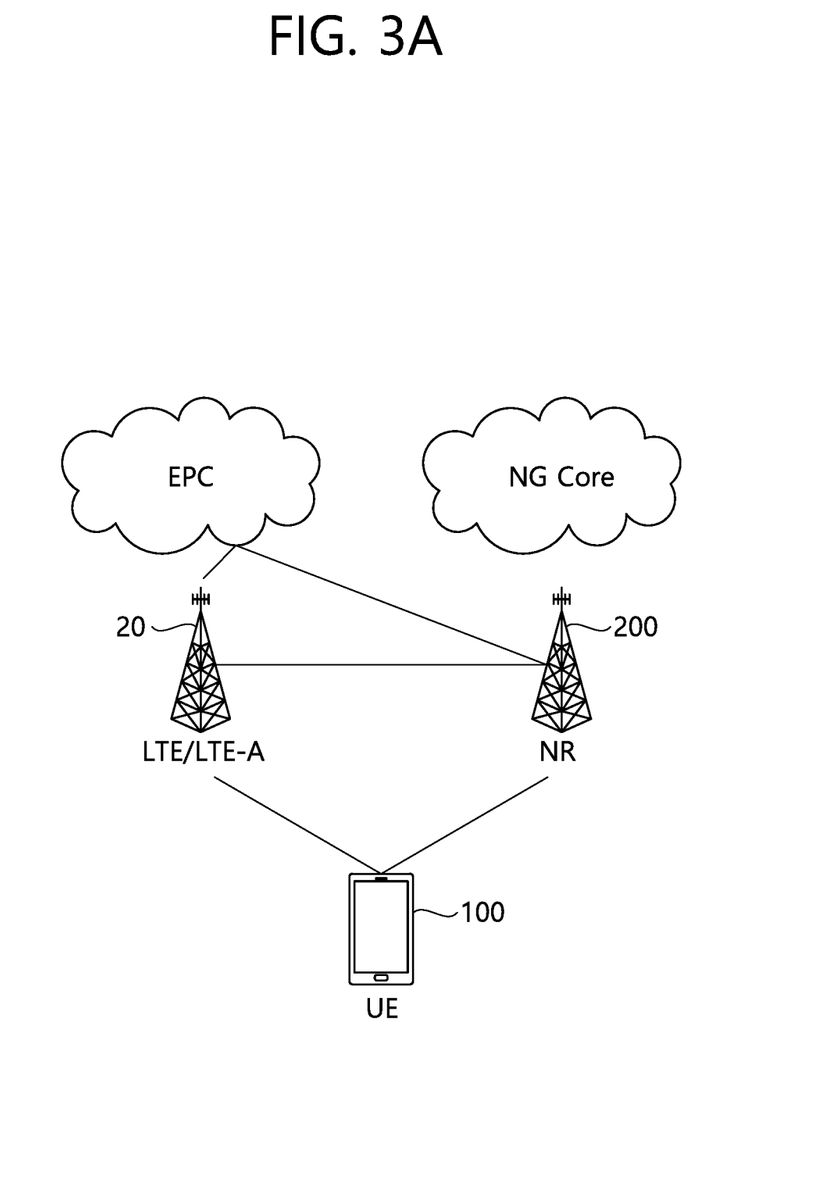
FIGS. 3A to 3C are exemplary diagrams illustrating exemplary architectures for services of the next-generation mobile communication.
Figure 3B:
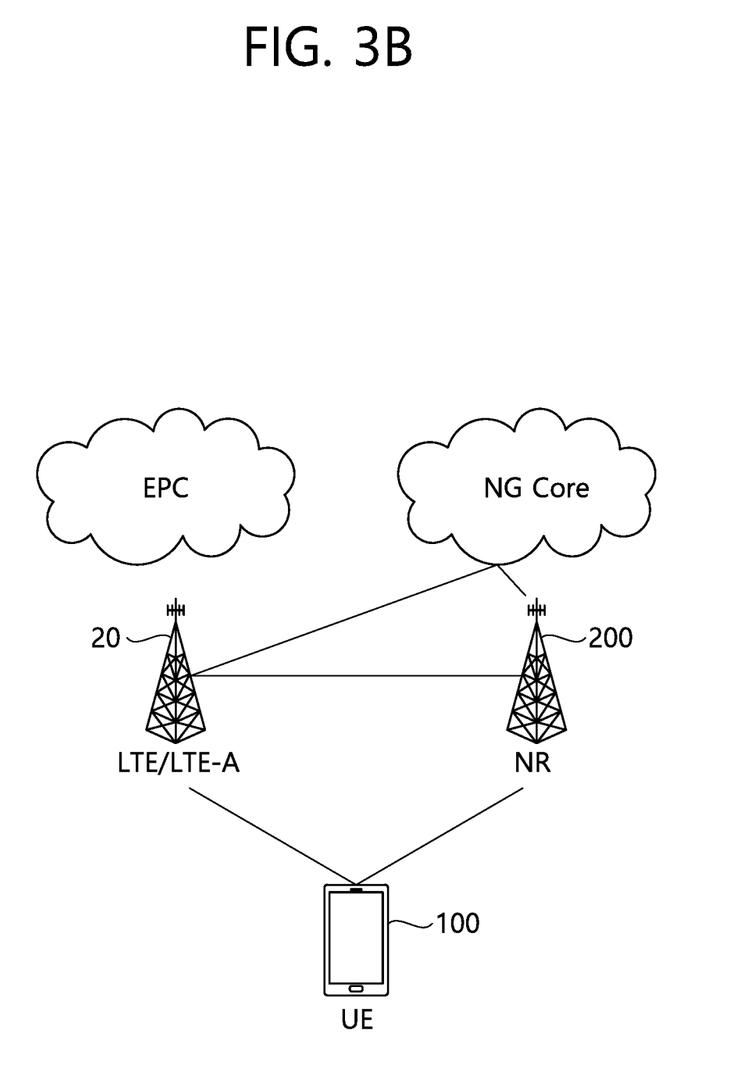
Figure 3C:
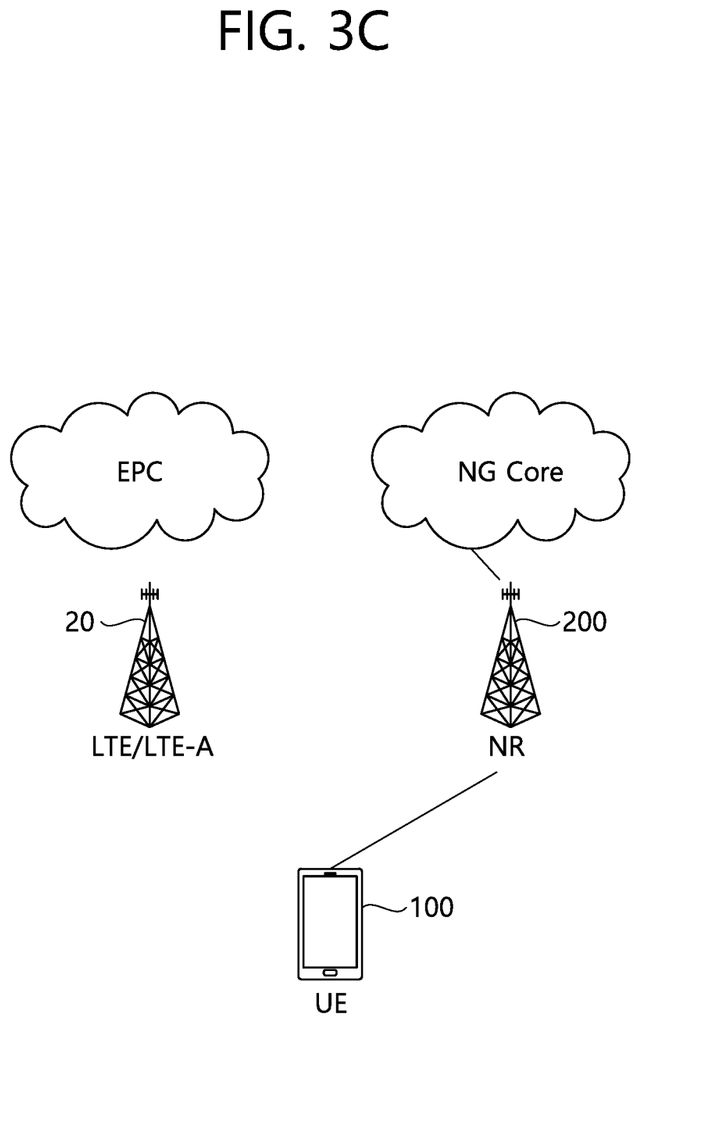

FIGS. 3A to 3C are Exemplary Diagrams Illustrating Exemplary Architectures for Services of the Next Generation Mobile Communication.

Referring to FIG. 3A, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 3B, unlike FIG. 3A, the LTE/LTE-A based cell is connected to a core network for the 5G mobile communication, that is, a next generation (NG) core network.

The service scheme based on the architecture as illustrated in FIGS. 3A and 3B is called non-standalone (NSA).

Referring to FIG. 3C, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

An NR frequency band may be defined as two types (FR1 and FR2) of frequency ranges. The frequency ranges may be changed. For example, the two types (FR1 and FR2) of frequency bands are illustrated in Table 1. For the convenience of description, among the frequency bands used in the NR system, FR1 may refer to a "sub-6-GHz range", FR2 may refer to an "above-6-GHz range" and may be referred to as a millimeter wave (mmW).

TABLE 1

| Frequency Range Designation | Corresponding Frequency Range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 2. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 2

| Frequency Range Designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

<Disclosure of the Present Specification>

I. Problems to be Solved in Disclosure of the Present Specification

In the NR standard, a terminal (or UE) using a specified high-frequency band is basically defined to support a 4Rx receiver and 4 Layer considering the attenuation characteristic of a radio channel environment of the specified high-frequency band (e.g., band n7, band n38, band n41, band n77, band n78, or band n79). Here, the 4 Rx receiver means a receiver supporting four reception beams, and 4 Layer means that a multiple-input and multiple-output (MIMO) layer is 4 Layer.

The automobile industry requires that the use of a 2Rx receiver is exceptionally allowed in vehicle-mounted wireless communication devices in consideration of vehicle design constraints, vehicle implementation constraints, and vehicular cost-efficiency. According to this requirement of the automobile industry, standards associated with vehicle-mounted wireless communication devices in 5G are being established. In the standardization process, issues arise concerning 1) coverage and 2) a UE type distinction method.

1) When a vehicular wireless communication device having a 2Rx receiver (hereinafter, '2Rx vehicle UE') is used in a band in which a 4Rx receiver is used (hereinafter, '4Rx band'), a high-gain directional antenna is generally used for the 2Rx vehicle UE. For example, the 2Rx vehicle UE may obtain a high gain using a reception beam directed in the traveling direction of a vehicle. Further, when the 2Rx vehicle UE is used, human body transmission loss generated in the use of a handheld UE is excluded, and thus the 2Rx vehicle UE can provide wider coverage than a 4Rx handheld UE.

2) Since a vehicle UE and a handheld UE may require different service conditions, it is necessary to provide services having different requirements (e.g., Quality of Service (QoS)) for the vehicle UE and the handheld UE. Further, it is necessary to exceptionally allow a 2Rx receiver only in the vehicle UE and to exclude a 2Rx handheld UE from a network. In particular, the 2Rx handheld UE may affect the overall network stability. Operators need a method for excluding 2Rx handheld UEs that can affect the overall stability of a network. However, there is no existing method for distinguishing a UE type. Therefore, there is also no method for blocking network access of a 2Rx handheld UE.

II. Disclosure of the Specification

A disclosure of the present specification proposes a method for solving the foregoing problems. For example, the disclosure of the present specification proposes a method for distinguishing a UE type and a method for allowing or blocking (or rejecting) network access of a UE according to the UE type.

When a 2Rx vehicle UE is allowed in 5G, there may be, for example, a 4Rx handheld UE, a 2Rx handheld UE, a 4Rx vehicle UE, and the 2Rx vehicle UE in a 5G network.

Among these four types of UEs, a UE whose network access is allowed in 5G and a UE whose network access is blocked (or rejected) in 5G are illustrated in Table 3.

TABLE 3

|  | Handheld | Vehicle |
|---|---|---|
| 4Rx | Valid | Valid |
| 2Rx | Forbidden | Valid |

In Table 3, Valid denotes a UE whose network access is allowed in 5G. Forbidden denotes a UE whose network access is blocked (or rejected) in 5G.

In the current NR standard, any UE is defined to basically support 4 Layer in a 4Rx band. When a 2Rx vehicle UE is introduced, the 2Rx vehicle UE can inevitably support only 2 Layer. Accordingly, a network node may implicitly determine the number of reception beams of a UE on the basis of the number of MIMO layers supported by the UE.

A UE reports UE capability information (or terminal capability information) to a network. The UE capability information may include MIMO layer information. An example of the MIMO layer information is illustrated in Table 4.

TABLE 4

```
-- ASN1START
-- TAG-MIMO-LAYERS-START
MIMO-LayersDL ::=   ENUMERATED {twoLayers, fourLayers,
eightLayers}
MIMO-LayersUL ::=   ENUMERATED {oneLayer, twoLayers,
fourLayers}
-- TAG-MIMO-LAYERS-STOP
-- ASN1STOP
```

In Table 4, MIMO-LayersDL denotes a downlink (DL) MIMO layer. MIMO-LayersUL denotes an uplink (UL) MIMO layer. According to the example in Table 4, the downlink MIMO layer includes 2 Layer, 4 Layer, and 8 Layer. The uplink MIMO layer includes 1 Layer, 2 Layer, and 4 Layer.

A 2Rx UE may report to the network that MIMO layer information is 2 Layer. When receiving the UE capability information, the network node (e.g., AMF or MME) can recognize that the UE is a 2Rx UE but cannot know whether the type of the UE is a 2Rx vehicle UE or a 2Rx handheld UE. Accordingly, the network cannot determine whether to allow network access of the UE and cannot provide a service corresponding to the type of the UE.

The network node according to the disclosure of the present specification may use identity information about a UE to distinguish the type of the UE. The identity information may be, for example, an International Mobile Equipment Identity (IMEI). The IMEI may be identity information of a 15-digit number embedded in any UE internationally used. The IMEI may be the unique serial number of a UE. The IMEI may include information about the UE, such as the manufacturer of the UE and the model of the UE.

Illustrative methods for a network node to allow or block (or reject) network access of a UE using identity information are shown as follows. For example, a white list method may be a method in which a network node allows network access of a UE when the IMEI of the UE is stored in a white list. In another example, a black list method is a method in which a network node regards a UE as an illegal UE and blocks (or rejects) network access of the UE when the IMEI of the UE is stored in a black list. In the black list method, a network node may allow network access of any UE other than an illegal UE.

The network node may conditionally allow network access of a UE in consideration of identity information and UE capability information. Specifically, the network node may allow or block (or reject) the network access of the UE in consideration of a list in which the identity information is stored, the identity information, and the UE capability information. Here, the list in which the identity information is stored is referred to as, for example, a gray list.

The gray list may include the IMEI of a UE whose network access is exceptionally allowed among UEs having UE capability information inappropriate for network access. For example, the gray list may include the IMEI of a 2Rx vehicle UE whose network access is exceptionally allowed in a network using a 4Rx band. The gray list may be stored in advance in the network node. An operator may update the gray list stored in the network node when it is necessary to update the UE whose network access is exceptionally allowed.

For reference, the term "gray list" is merely an example for explanation, and the scope of the present specification includes any list that stores identity information used by the network node.

Before describing a specific example in which a network node allows network access of a UE on the basis of identity information and UE capability information, an example of an initial network access procedure of a UE related to the disclosure of the present specification will be described.

Figure 4:
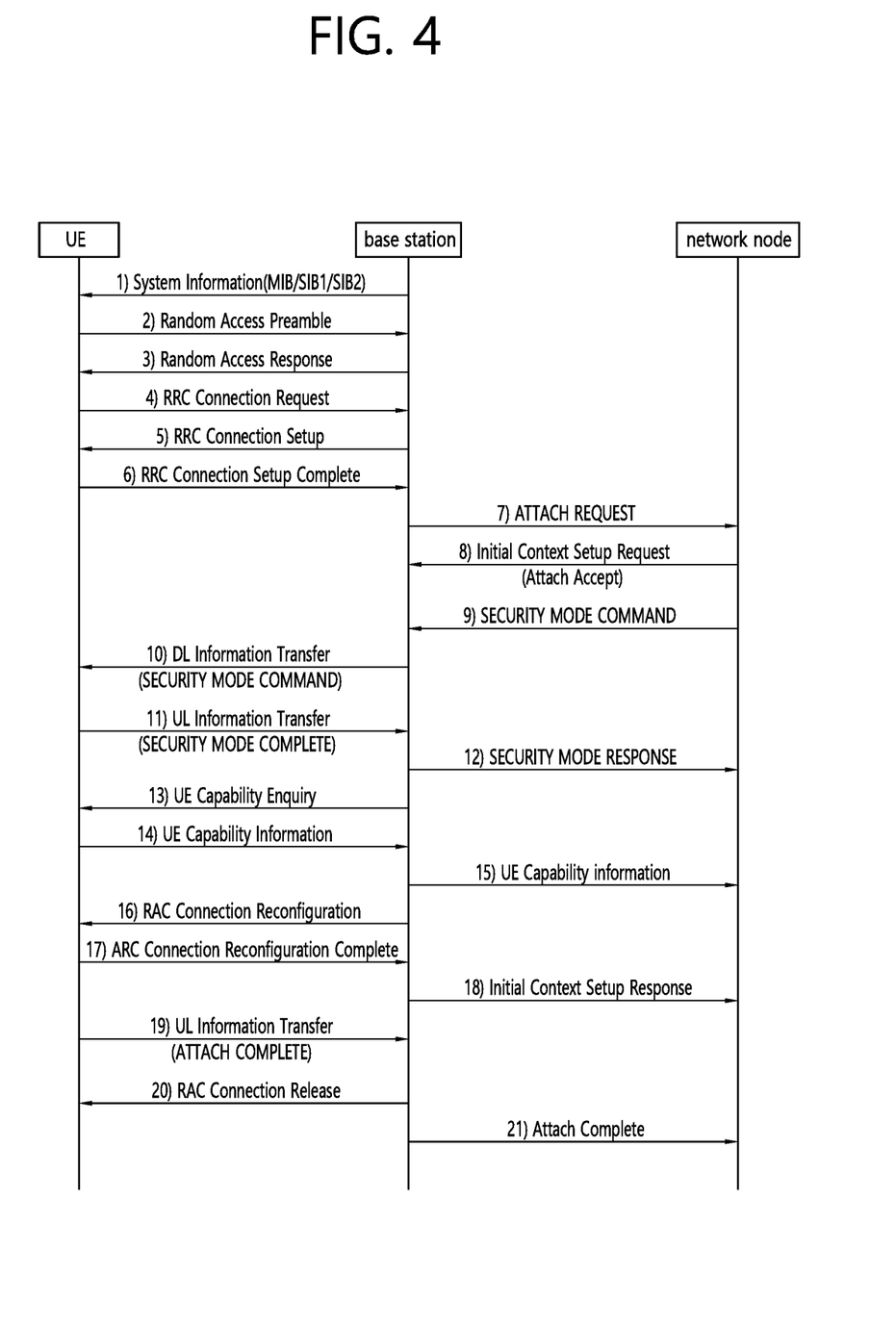
FIG. 4 illustrates an initial network access procedure according to a disclosure of the present specification.
Figure 5:
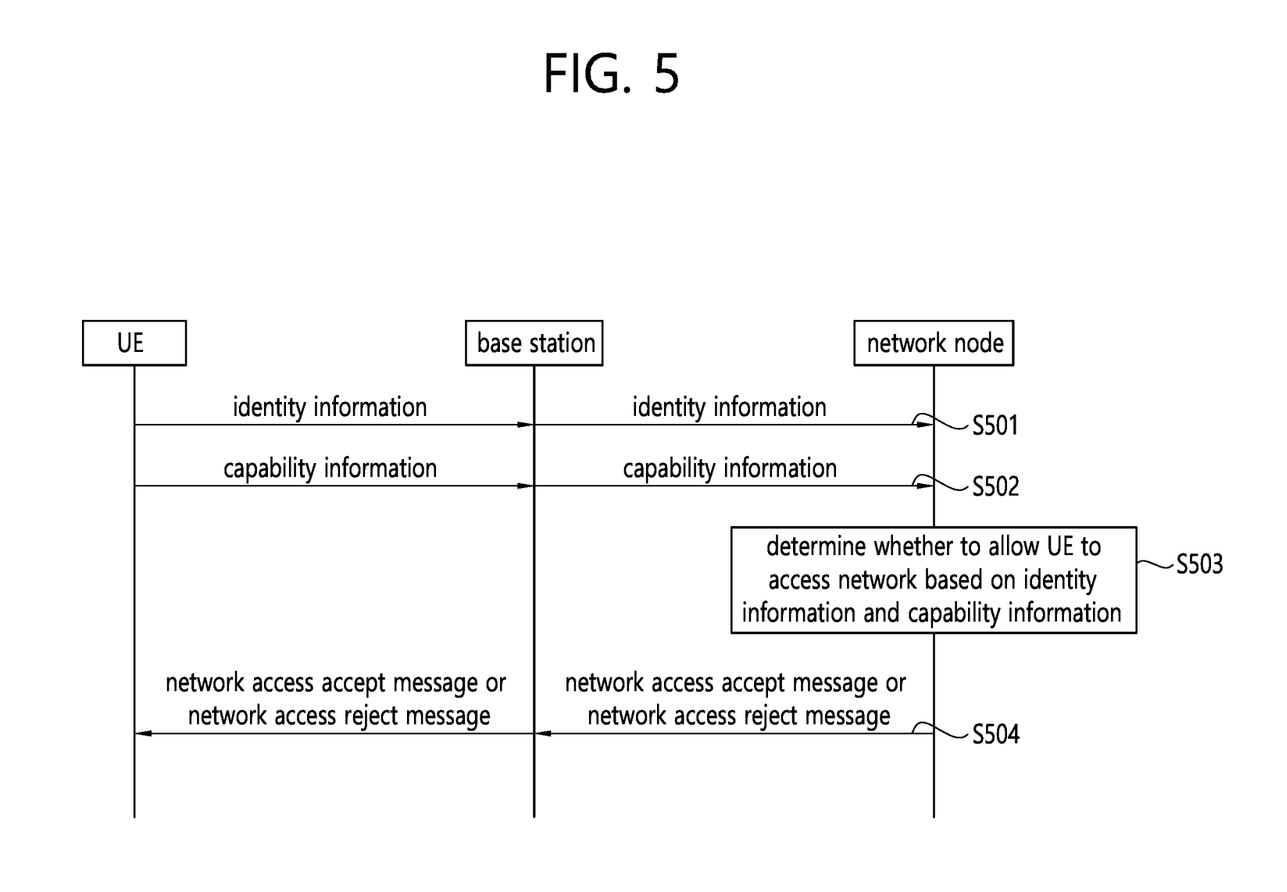
FIG. 5 is a flowchart illustrating the operations of a UE, a base station, and a network according to a disclosure of the present specification.

For reference, in FIG. 4 and FIG. 5, a UE may be the UE 100 illustrated in FIG. 2 to FIG. 3C and includes a wireless communication device performing wireless communication in 5G. A base station may be the gNB 200 illustrated in FIG. 2 to FIG. 3C and includes a base station that communicates with the wireless communication device in 5G. A network node may be the MME 51 illustrated in FIG. 1 or the AMF 410 illustrated in FIG. 2. In FIG. 4 and FIG. 5, the UE, the base station, and the network node may provide a NAS- or SA-based service as described in the examples of FIG. 3A to FIG. 3C.

FIG. 4 Illustrates an Initial Network Access Procedure According to a Disclosure of the Present Specification.

The initial network access procedure illustrated in FIG. 4 is provided only for illustration. Some of operations illustrated in FIG. 4 may be omitted, and the operations may be performed in a different order from that illustrated.

1) A base station may transmit system information to a UE. The system information may include at least one of an MIB, SIB1, and SIB2. Here, an MIB represents a master information block. An SIB represents a system information block.

2) The UE may transmit a random access preamble to the base station.

3) Upon receiving the random access preamble from the UE, the base station may transmit a random access response message to the UE.

4) Upon receiving the random access response, the UE may transmit a radio resource control (RRC) connection request message to the base station.

5) Upon receiving the RRC connection request, the UE may transmit an RRC connection setup message to the UE.

6) Upon receiving the RRC connection setup message, the UE may transmit an RRC connection setup complete message to the base station.

7) The base station may transmit an attach request message to a network node.

8) The network node may transmit an initial context setup request message. FIG. 4 shows an example in which the attach is accepted. The initial context setup request message may include attach accept information.

9) The network node may transmit a security mode command message to the base station. The network node may transmit the security mode command message to the UE, thereby enabling the UE to generate a non-access stratum (NAS) security key. The network node may transmit the security mode command message by integrity protection.

10) The base station may transmit a DL information transfer message. The DL information transfer message may include a security mode command received from the network node.

11) When the UE attempts network access, the UE may transmit a UL information transfer message to the base station. The UL information transfer message may include a security mode complete message. Here, the UE may transmit the security mode complete message, thereby reporting that the NAS security key is completely generated.

12) The base station may transmit a security mode response message to the network node. Here, the security mode response message may include identity information about the UE. For example, the identity information may include the IMEI of the UE. The network node may obtain the identity information about the UE. That is, when the UE attempts the network access, the UE may report the identity information to the network node through the security mode command message and the security mode response message. The UE may transmit the identity information to the base station at a random time before operation 12).

13) The base station may transmit a UE capability enquiry message to the UE.

14) The UE may transmit UE capability information to the base station through RRC signaling. Here, the UE capability information may include MINO layer information about the UE as illustrated in Table 4.

15) The base station may transmit the UE capability information to the network node. The network node may obtain the UE capability information including the MIMO layer information. That is, the UE may report the UE capability information to the base station through RRC signaling, and the UE capability information may be included in a UE capability information message to be reported to an MME.

The network node may determine whether to allow the network access of the UE on the basis of the UE capability information and the identity information about the UE. A specific example in which the network node determines whether to allow the network access of the UE will be described with reference to operation S503 in FIG. 5.

FIG. 4 shows an example in which the network node allows the network access of the UE.

Although not shown in the drawing, the network node may transmit a message associated with a determination result to the UE after determining whether to allow the network access of the UE.

For example, the network node may transmit a network access allow message or a network access block (or reject) message to the UE via the base station after operation 15), which will be described in detail with reference to operation S504 in FIG. 5.

16) The base station may transmit an RRC connection reconfiguration message to the UE.

17) The UE may transmit an RRC connection reconfiguration complete message to the base station.

18) The base station may transmit an initial context setup complete message to the network node.

19) The UE may transmit a UL information transfer message to the base station. The UL information transfer message may include an attach complete message.

20) The base station may transmit an RRC connection release message to the UE.

21) The base station may transmit the attach complete message to the network node.

As described in the example illustrated in FIG. 4, the network node may obtain the identity information about the UE through the security mode response message in 12) and may obtain capability information about the UE through the UE capability information in 15).

As described in 15), the network node may determine whether to allow the network access of the UE on the basis of the capability information about the UE and the identity information about the UE.

FIG. 5 is a flowchart illustrating the operations of a UE, a base station, and a network according to a disclosure of the present specification.

In operation S501, the UE may transmit identity information to the base station. The base station may transmit the identity information to the network node. The base station may transmit the identity information to the network node by including the identity information in the security mode response message described in 12) in the example of FIG. 4.

In operation S502, the UE may transmit capability information to the base station. The base station may transmit the capability information to the network node. The base station may transmit the capability information to the network node as in transmission of the UE capability information described in 15) in the example of FIG. 4.

In operation S503, the network node may determine whether to allow network access of the UE on the basis of the identity information and the capability information. The capability information may include MIMO layer information about the UE. The network node may determine the type of the UE on the basis of the identity information. The type of the UE may include a handheld UE and a vehicle UE.

The network node may determine whether to allow the network access of the UE on the basis of the identity information and the MIMO layer information. The network node may identify whether at least one of the identity information and the MIMO layer information exists in a gray list that the network node has and may then determine whether to allow the network access of the UE.

For example, when the UE capability information transmitted from the UE includes UE capability information inappropriate for a network, the network node may retrieve the identity information about the UE from the gray list.

Specifically, when the network to which the UE attempts to access is a network using a 4Rx band and the UE capability information includes information indicating that the MIMO layer of the UE is 2 Layer, the network node may retrieve the identity information about the UE from the gray list. When the MIMO layer of the UE is 2 Layer and the identity information about the UE exists in the gray list, the network node may determine that the network access of the UE is exceptionally allowed and may allow the network access of the UE. When the MIMO layer of the UE is 2 Layer and the identity information about the UE does not exist in the gray list, the network node may determine the UE as an illegal UE and may block (or reject) the network access of the UE.

For reference, a white list or a black list may be used when the network node determines alone whether to allow network access of a UE by simply comparing identity information (e.g., IMEI) with the list.

A gray list may be used when the network node determines whether to allow network access of a UE by comparing identity information about the UE, capability information about the UE, and the gray list. Specifically, when UE capability information corresponding to an exceptional condition other than UE capability information allowed for network access exists in a gray list, the network node may conditionally determine whether to allow network access of a UE using the gray list on the basis of the exceptional condition.

When the gray list is applied to exceptionally allow the network access of a 2Rx vehicle UE by distinguishing the 2Rx vehicle UE, an exceptional condition in the gray list may be a case where the MIMO layer in the UE capability information is 2 Layer. A specific example in which the network node uses the gray list is shown in Table 5 below.

TABLE 5

|  | UE capability information (MIMO Layer) | Whether included in gray list | Whether gray list check is performed | Network access |
| --- | --- | --- | --- | --- |
| 4Rx Handheld UE | 4 | No | No | Allowed |
| 2Rx Handheld UE | 2 | No | Yes | Blocked (or rejected) |
| 4Rx Vehicle UE | 4 | Yes(included) or No | No | Allowed |
| 2Rx Vehicle UE | 2 | Yes(included) | Yes | Allowed |

In Table 5, regarding UE capability information, 4 denotes 4 Layer, and 2 denotes 2 Layers. Table 5 shows an example of a gray list that can be applied to a network using a 4Rx band.

Referring to the example of Table 5, when the MIMO layer of the UE is 2 Layer, the network node may perform a gray list check for the UE.

For example, when the MIMO layer of the UE is 2 Layer, the network node may determine whether the identity information about the UE is included in the gray list. When the identity information about the UE is included in the gray list, the network node may allow the network access of the UE. When the identity information about the UE is not included in the gray list, the network node may block (or reject) the network access of the UE.

In Table 5, for example, since the 2Rx handheld UE has the MIMO layer of 2 Layer, the network node may perform a gray list check for the 2Rx handheld UE. Since identity information about the 2Rx handheld UE is not included in the gray list, the network node may block (or reject) network access of the 2Rx handheld UE.

In Table 5, for example, since the 2Rx vehicle UE has the MIMO layer of 2 Layer, the network node may perform a gray list check for the 2Rx vehicle UE. Since identity information about the 2Rx vehicle UE is included in the gray list, the network node may allow network access of the 2Rx vehicle UE.

In operation S504, the network node may transmit a network access allow message or a network access block (or reject) message to the base station according to the result of determination in operation S03. For example, when the network node determines to allow the network access of the UE in operation S503, the network node may transmit a network access allow message to the base station. Then, the base station may transmit the network access allow message to the UE. In another example, the network node determines to block (or reject) the network access of the UE in operation S503, the network node may transmit a network access block (or reject) message to the base station. Them, the base station may transmit the network access block (or reject) message to the UE.

For reference, in the examples of FIG. 4 and FIG. 5, the process of determining whether to allow the network access of the UE is described as being performed by the network node (AMF or MME) of the higher network, which is merely an example. The process of determining whether to allow the network access of the UE according to the UE capability information, the identity information about the UE, and a gray list may be performed by various network entities including the base station.

The network node may allow the network access of the 2Rx vehicle UE in a band in which a 4Rx receiver is basically designated using the UE capability information, the identity information, and the gray list. In addition, the network node may block (or reject) the network access of the illegal 2Rx handheld UE.

The example of Table 5 shows that identity information about a 4Rx vehicle UE may or may not be included in the gray list. When the gray list includes identity information about all vehicle UEs, the network node may distinguish a vehicle UE and a handheld UE on the basis of the gray list, thereby providing services having different requirements (e.g., QoS) according to the type of a UE.

Figure 6:
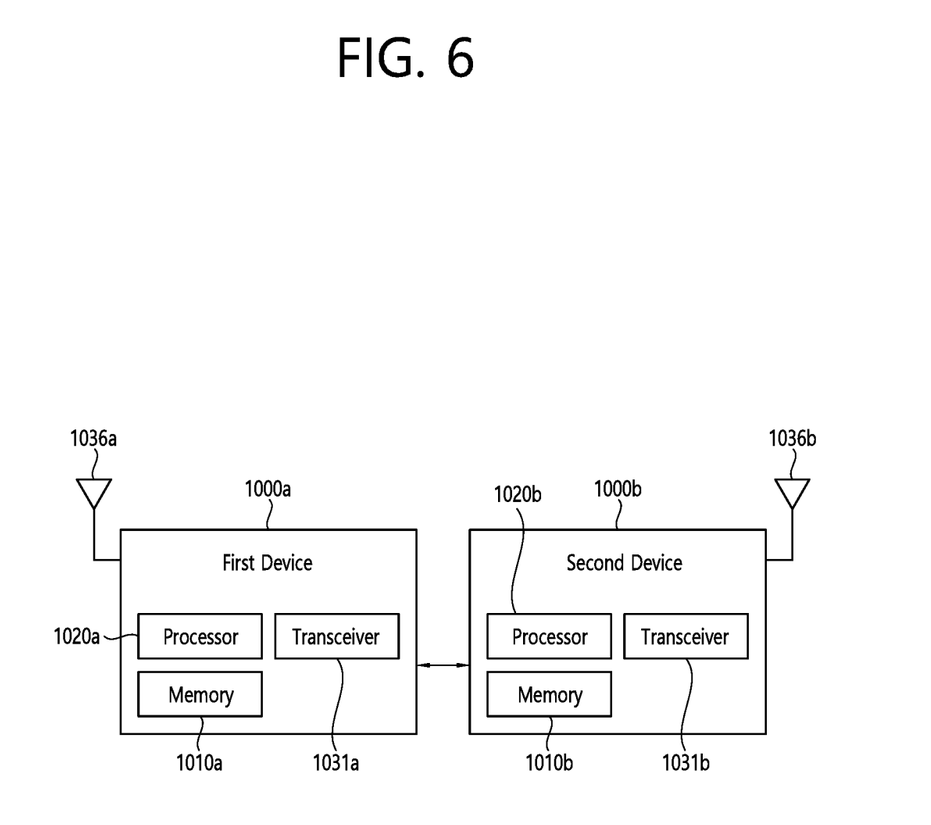
FIG. 6 illustrates a wireless communication device according to embodiments of the present specification.

FIG. 6 Illustrates a Wireless Communication Device According to Embodiments of the Present Specification.

FIG. 6 illustrates a wireless communication device according to an embodiment of the present specification.

Referring to FIG. 6, a wireless communication system may include a first device 1000a and a second device 1000b.

The first device 1000a may be a network (e.g., MME or AMF) illustrated in a disclosure of the present specification. Also, the first device 1000a may be a base station, a network node, a transmitting terminal, a receiving terminal, a wireless device, a wireless communication device, a vehicle, a vehicle equipped with an autonomous driving function, a connected car, a Unmanned Aerial Vehicle (UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

The second device 1000b may be a UE illustrated in a disclosure of the present specification. Also the second device 1000b may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

For example, the terminal may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 1000a may include at least one processor, such as a processor 1020a, at least one memory, such as a memory 9012, and at least one transceiver, such as a transceiver 1031a. The processor 1020a may perform the functions, procedures, and/or methods described above. The processor 1020a may perform one or more protocols. The processor 1020a may perform one or more layers of a radio interface protocol. The memory 9012 may be connected to the processor 1020a and store various types of information and/or commands. The transceiver 1031a may be connected to the processor 1020a and controlled to transmit/receive a radio signal.

The second device 1000b may include at least one processor, such as a processor 1020b, at least one memory, such as a memory 1010b, and at least one transceiver, such as a transceiver 1031b. The processor 1020b may perform the functions, procedures, and/or methods described above. The processor 1020b may implement one or more protocols. For example, the processor 1020b may implement one or more layers of the radio interface protocol. The memory 1010b may be connected to the processor 1020b and store various types of information and/or commands. The transceiver 1031b may be connected to the processor 1020b and controlled to transmit/receive a radio signal.

The memory 9012 and/or the memory 1010b may be each connected inside or outside the processor 1020a and/or the processor 1020b and connected to other processors through various techniques such as wired or wireless connection.

The first device 1000a and/or the second device 1000b may have one or more antennas. For example, an antenna 1036a and/or an antenna 1036b may be configured to transmit and receive the radio signal.

Figure 7:
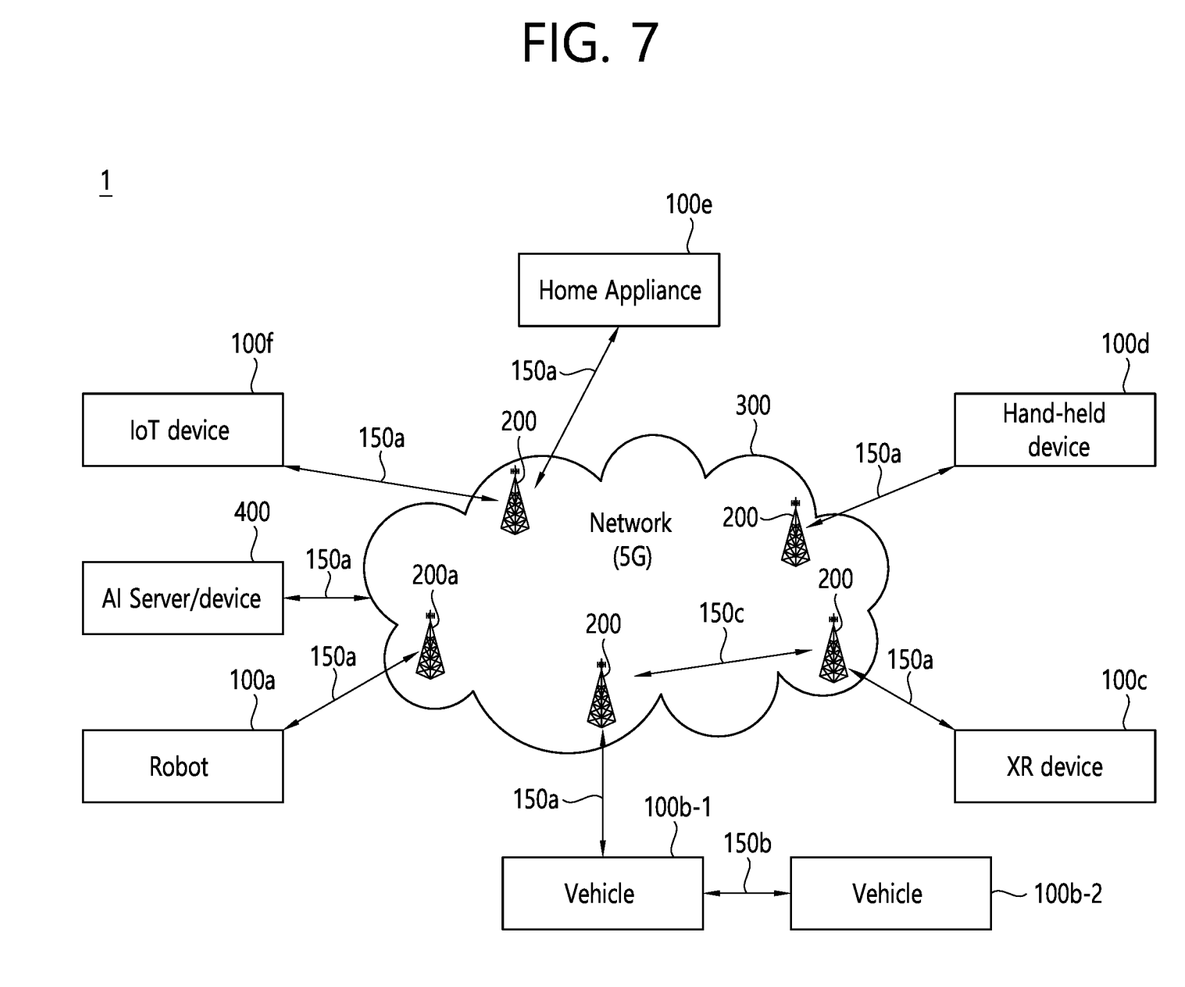
FIG. 7 illustrates an example of a communication system to which a disclosure of the present specification is applied.

FIG. 7 Illustrates an Example of a Communication System to which a Disclosure of the Present Specification is Applied.

Various descriptions, functions, procedures, suggestions, methods, and/or operational flowcharts disclosed in the present specification may be applied to, but not limited to, various fields that require wireless communication/connection (e.g., 5G) between devices.

Hereinafter, specific examples are illustrated with reference to a drawing. Unless specified otherwise, like reference numerals refer to like or equivalent hardware blocks, software blocks, or functional blocks through the following drawing/description.

FIG. 7 illustrates a communication system 1 applied to disclosures of the present specification.

Referring to FIG. 7, the communication system 1 applied to the disclosures of the present specification includes a wireless device, a base station, and a network. Here, the wireless device refers to a device that performs communication using a radio access technology (e.g., 5G new RAT (NR) or LTE) and may be referred to as a communication/wireless/5G device. The wireless device may include, but not limited to, a robot 100a, vehicles 100b-1 and 100b-2, an extended reality (XR) device 100c, a handheld device 100d, a home appliance 100e, an Internet of Things (IoT) device 100f, and an AI device/server 400. For example, the vehicles may include a vehicle having a wireless communication function, a self-driving vehicle, a vehicle capable of V2V communication, or the like. Here, the vehicles may include an Unmanned Aerial Vehicle (UAV, e.g., a drone). The XR device may include an Augmented Reality (AR)/Virtual Reality (VR)/Mixed Reality (MR) device and may be provided as a Head-Mounted Device (HMD), a vehicle-mounted Head-Up Display (HUD), a television, a smartphone, a computer, a wearable device, a home appliance, digital signage, a vehicle, a robot, or the like. The handheld device may include a smartphone, a smart pad, a wearable device (e.g., a smart watch and smart glasses), a computer (e.g., a laptop computer), or the like. The home appliance may include a TV, a refrigerator, a washing machine, or the like. For example, the base station and the network may also be configured as wireless devices, and a particular wireless device 200a may operate as a base station/network node for another wireless device.

The wireless devices 100a to 100f may be connected to the network 300 through the base station 200. AI technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g., sidelink communication) without passing through the base station/network. For example, the vehicles 100b-1 and 100b-2 may perform direct communication (e.g. Vehicle-to-Vehicle (V2V)/Vehicle-to-Everything (V2X) communication). Further, the IoT device (e.g., a sensor) may directly communicate with another IoT device (e.g., a sensor) or different wireless devices 100a to 100f.

Wireless communications/connections 150a, 150b, and 150c may be performed between the wireless devices 100a to 100f and the base station 200 and between the base stations 200. Here, the wireless communications/connections may be performed by various radio access technologies (e.g., 5G NR), such as uplink/downlink communication 150a, sidelink communication 150b (or D2D communication), and communication 150c between base stations (e.g., a relay and an Integrated Access Backhaul (IAB)). The wireless communications/connections 150a, 150b, and 150c enable a wireless device and a base station/wireless device or base stations to transmit/receive radio signals to/from each other. For example, the wireless communications/connections 150a, 150b, and 150c may transmit/receive signals through various physical channels. To this end, at least some of various configuration information setup processes, various signal processing processes (e.g., channel encoding/decoding, modulation/demodulation, resource mapping/demapping, and the like), and a resource allocation process for transmitting/receiving a radio signal may be performed on the basis of various suggestions disclosed in the present specification.

In the above exemplary systems, although the methods have been described on the basis of the flowcharts using a series of the steps or blocks, the scope of the present specification is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present specification.

The claims described in the present specification may be combined in various ways. For example, the technical features of the method claims disclosed herein may be combined to realize a device, and the technical features of the device claims disclosed herein may be combined to realize a method. In addition, the technical features of the method claims and the technical features of the device claims disclosed herein may be combined to realize a device, and the technical features of the method claims and the technical features of the device claims disclosed herein may be combined to realize a method.

What is claimed is:

1. A method for determining, by a network node, network access of a user equipment (UE), the method comprising, receiving identity information of the UE from a base station to which the UE is connected;
receiving capability information of the UE from the base station,
wherein the capability information of the UE includes multiple-input and multiple-output (MIMO) layer information of the UE;
determining that a MIMO layer of the UE is 2 Layer based on the MIMO layer information;
determining that a type of the UE as a handheld UE or a vehicle UE based on the identity information; and
based on that the MIMO layer of the UE is 2 Layer and based on a communication between the UE and the base station is performed based on a 4 Reception (Rx) band, determining whether to allow network access of the UE based on the type of the UE,
wherein the 4 Rx band is a high-frequency band defined to support 4 Layer of MIMO layer,
wherein the network access of the UE is allowed based on that the type of the UE is the vehicle UE and the MIMO layer of the UE is 2 Layer, and
wherein the network access of the UE is not allowed based on that the type of the UE is the handheld UE and the MIMO layer of the UE is 2 Layer.

2. The method of claim 1, wherein the determining whether to allow the network access is performed after identifying whether at least one of the identity information and the MIMO layer information exists in a list that the network node has.

3. The method of claim 1,
wherein the determining whether to allow the network access is performed based on comparing the identity information with a list related to the network access when the MIMO layer of the UE is 2 Layer.

4. The method of claim 1, wherein the network node is a Mobility Management Entity (MME).

5. The method of claim 1, wherein the network node is an Access and Mobility Management Function (AMF).

6. A network node for determining network access of a user equipment (UE), the network node comprising:
a transceiver; and
a processor controls the transceiver,
wherein the processor is configured to perform operations comprising:
receiving identity information of the UE from a base station to which the UE is connected;
receiving capability information of the UE from the base station,
wherein the capability information of the UE comprising multiple-input and multiple-output (MIMO) layer information of the UE;
determining that a MIMO layer of the UE is 2 Layer based on the MIMO layer information;
determining that a type of the UE as a handheld UE or a vehicle UE based on the identity information; and
based on that the MIMO layer of the UE is 2 Layer and based on a communication between the UE and the base station is performed based on a 4 Reception (Rx) band, determining whether to allow network access of the UE based on the type of the UE,
wherein the 4 Rx band is a high-frequency band defined to support 4 Layer of MIMO layer,
wherein the network access of the UE is allowed based on that the type of the UE is the vehicle UE and the MIMO layer of the UE is 2 Layer, and
wherein the network access of the UE is not allowed based on that the type of the UE is the handheld UE and the MIMO layer of the UE is 2 Layer.

7. The network node of claim 6, wherein the determining whether to allow the network access is performed after identifying whether at least one of the identity information and the MIMO layer information exists in a list that the network node has.

8. The network node of claim 6,
wherein the determining whether to allow the network access is performed based on comparing the identity information with a list associated with the network access when the MIMO layer of the UE is 2 Layer.

9. The network node of claim 6, wherein the network node is a Mobility Management Entity (MME).

10. The network node of claim 6, wherein the network node is an Access and Mobility Management Function (AMF).

* * * * *